(No Model.) 2 Sheets—Sheet 1.

C. W. ISBELL.
CONDENSER SCRUBBER FOR GAS.

No. 293,884. Patented Feb. 19, 1884.

Witnesses:
Inventor:
Chas. W. Isbell (No Model.) 2 Sheets—Sheet 2.

C. W. ISBELL.
CONDENSER SCRUBBER FOR GAS.

No. 293,884. Patented Feb. 19, 1884.

UNITED STATES PATENT OFFICE.

CHARLES W. ISBELL, OF NEW YORK, N. Y.

CONDENSER-SCRUBBER FOR GAS.

SPECIFICATION forming part of Letters Patent No. 293,884, dated February 19, 1884.

Application filed February 9, 1883. (No model.)

*To all whom it may concern:*

Be it known that I, CHARLES W. ISBELL, of the city, county, and State of New York, have invented a new and Improved Condenser-Scrubber for Gas, of which the following is a specification.

I term my improved apparatus a "condenser-scrubber," because, in passing through it, the gas is not only washed, but is also cooled and condensed, and where my improved apparatus is used the ordinary condenser may in many cases be dispensed with.

It is well known in the operation of gas-scrubbers that the cooler the gas and water the more ammonia will be taken up, and for this reason it has been necessary to provide scrubbers which are much too large for use in winter, in order that they may be of sufficient size for use in the summer.

The principal object of my invention is to control the temperature of the gas and washing-water in warm weather, so that a scrubber of suitable size for use in cold weather may suffice for use in warm weather, and so that the ammoniacal liquor will be in a more concentrated state, and will therefore have an increased value.

To these ends my invention includes an improved method of scrubbing gas, which consists in causing both the gas and the scrubbing-liquor to pass in contact with artificially-cooled surfaces.

The invention also includes an improved method of operating a gas-scrubber, which consists in circulating or passing the gas and scrubbing water or liquor over surfaces contained in the scrubber, and in simultaneously and artificially cooling or refrigerating such surfaces during the passage of the gas and water over them, and cooling or refrigerating the atmosphere surrounding the scrubber.

The invention also includes novel combinations of parts in the apparatus which I employ in carrying out my invention, and which are hereinafter described and claimed.

Figure 1:
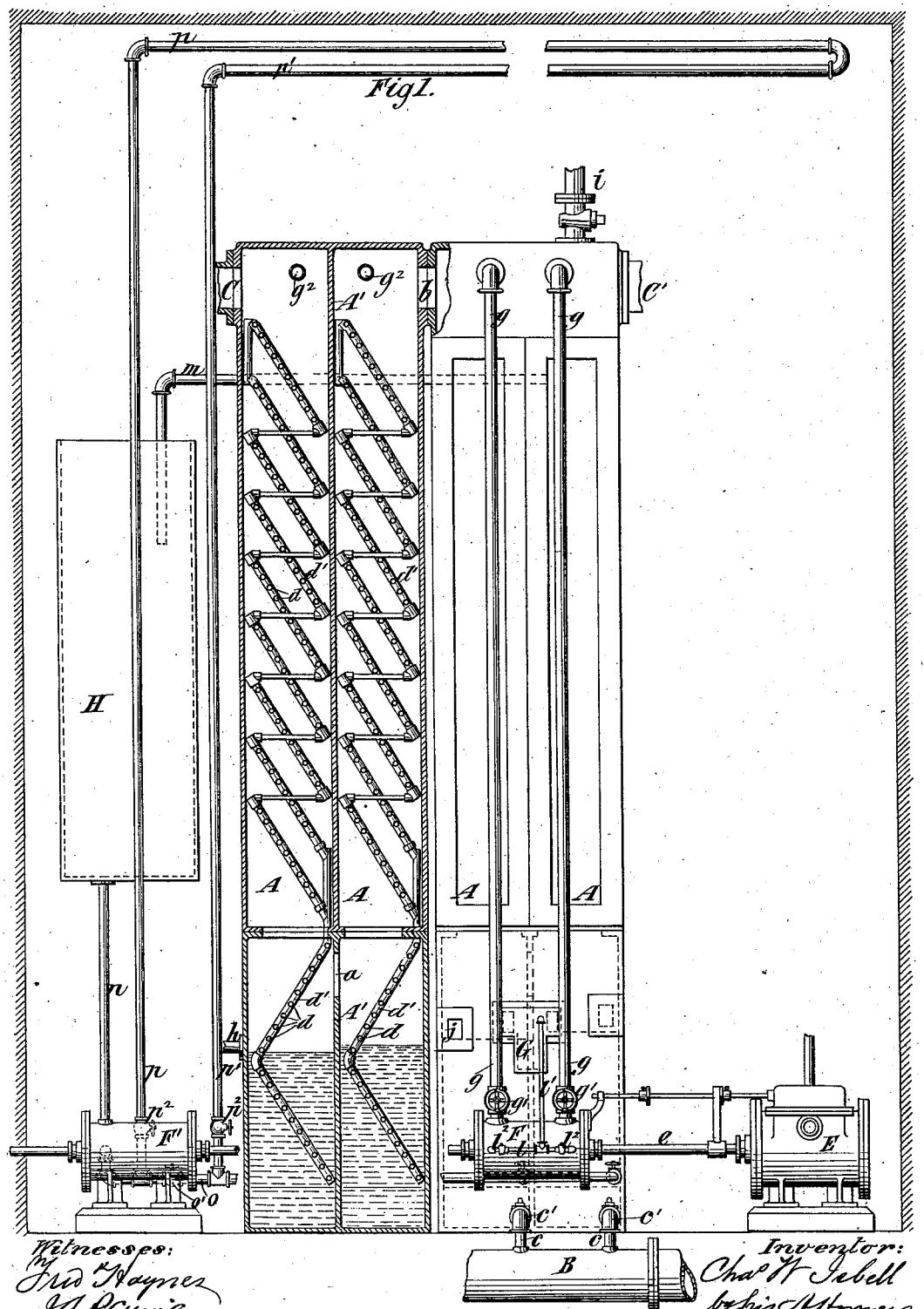
Figure 2:
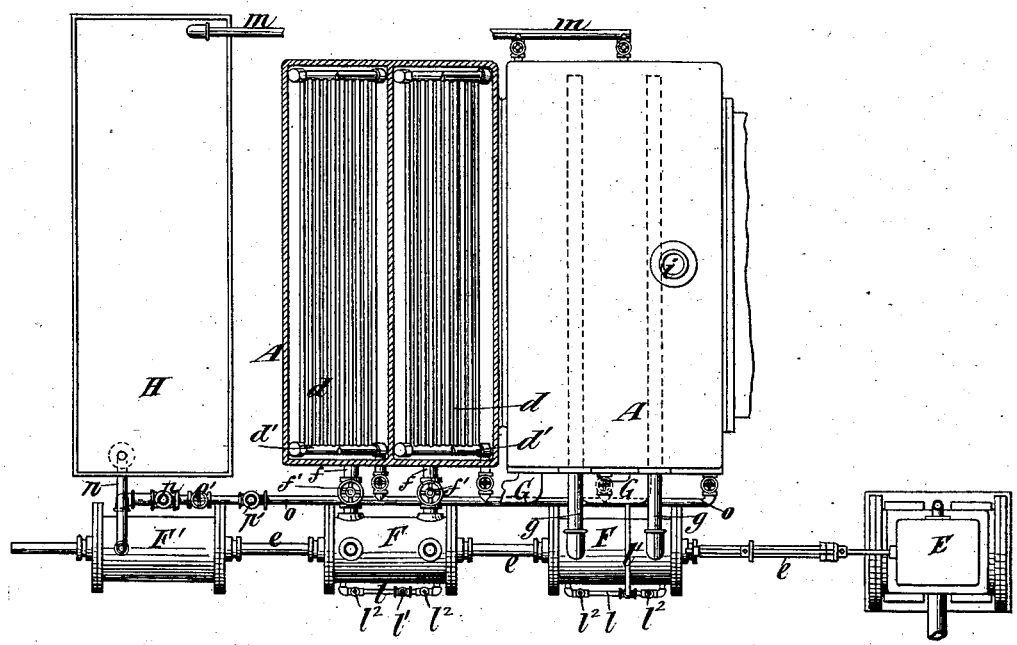

In the drawings, Figure 1 represents a partly-sectional elevation of an apparatus embodying my invention, and Fig. 2 represents a plan thereof.

Similar letters of reference designate corresponding parts in both figures.

The scrubber which I have chosen for the purpose of illustrating my invention, except in so far as it embodies my present invention, is like that shown and described in my application for Letters Patent filed November 29, 1882, and of which the serial number is 78,025.

A designates upright chambers, of which any number may be used to form a scrubber of any desired capacity. As here shown, the chambers are arranged in pairs, and each pair forms a distinct and separate structure, which may be of cast or wrought iron. The two chambers of each pair are separated by a partition, A'.

C designates the gas-inlet, which communicates with the chamber A at one end of the scrubber, near the upper end thereof, and C' designates the gas-outlet, leading from the upper portion of the chamber at the opposite end of the scrubber. In each partition A', which separates the chambers of each pair, and near the lower end thereof, is an opening, *a*. The chambers A of each pair communicate by means of nozzles *b* with the chambers of adjacent pairs, near their upper ends. The several chambers may all rest upon the same foundation, and each chamber communicates by a pipe, *c*, in which is a valve or cock, *c'*, with a common conduit, B, for carrying off the tar. The required extent of surface in the chambers A for the water or liquor and gas to pass over is formed by inclined rows or tiers of parallel tubes *d*, which are connected at the ends by headers *d'* on opposite sides of the chamber. The headers and parallel tubes form a system of tubes which extend downward into the liquor at the bottom of the chamber and afford extensive passages or conduits for the circulation of any cooling or refrigerating agent or fluid.

I will now describe the means employed for producing a circulation of ammoniacal liquor in the scrubber, premising, however, that other means may be used for the purpose.

E designates the steam or motor cylinder of a direct-acting engine, and F designates double-acting pump-cylinders, one of which is employed in connection with each pair of chambers. The pistons of the steam-engine and pumps are or may be all connected by a common piston-rod, *e*. Each pump is double-acting, and the ends of its cylinder are connected by suction-pipes $f$ with the lower portion of the chambers of each pair, and by discharge-pipes $g$ with the upper portion of both chambers of each pair. In the suction-pipes $f$ are valves $f'$, which may be more or less closed, as is desired, and in the discharge-pipes are corresponding valves, $g'$. The upper end of each discharge-pipe $g$ enters the chamber, and has or may have a horizontally-extending portion, $g^2$, perforated on the top or upper side, so that the liquor will be discharged with considerable velocity against the top of the chamber. The liquor trickles down over the several inclined rows or tiers of tubes $d$, and keeps their surfaces constantly wet and returns to the bottom of the several chambers. The gas enters at the inlet C and passes downward over and among the wet tubes, thence through the opening $a$ to the other chamber of the pair and upward over and among the system of tubes $d$, thence through the nozzle $b$ to and through the first chamber of the next pair, and so on until it makes its exit at the outlet-pipe $C'$. From the chamber A, in which is the inlet C, the ammoniacal liquor escapes through a pipe, $h$, and at the opposite end of the scrubber is an inlet-pipe, $i$, through which water is introduced to maintain the supply. On the sides of the several chambers are overflow openings or apertures $j$, covered by overflow-boxes G, which serve to maintain the proper level of liquor in the several chambers.

In order to vary or control the degree of concentration which takes place in any one chamber, the speed of the engine may be increased or diminished, or the amount of liquid raised may be varied by opening or closing the valves $f'$ in the pipe $f$. In case it is desirable to put one pump or either end of the same entirely out of action, I provide each pump F with a pipe, $l$, connecting its ends, and communicating with a pipe, $l'$, which leads from the gas-space of the scrubber, it being attached to the upper part of one of the overflow-boxes G, or to the chamber elsewhere. In the pipe $l$ are cocks or valves $l^2$, and by closing the valves $f'$ $g'$ and opening the valves $l^2$ the pump will be made to draw gas from the scrubber and deliver it through pipes $l$ $l'$, thus pumping gas instead of liquor.

H designates a cooler, which may be of any suitable character. It may contain ice or the brine from an ice-machine, and the upper ends of the systems of pipes or tubes $d$ $d'$ in the several chambers are connected with it by a pipe, $m$.

F' designates a pump-cylinder, the piston of which may be attached to the piston-rod $e$ or operated by a separate motor. The suction-pipe $n$ of this pump extends from the cooler H, and its discharge-pipe $o$ communicates with the lower ends of the tube systems in the several chambers.

$p$ $p'$ designate a system of pipes, which are connected with the discharge-pipe $o$ on opposite sides of a valve, $o'$, and which extend through the room wherein the scrubber is situated. In the pipes $p$ $p'$ are valves $p^2$. When the valves $p^2$ are closed and the valve $o'$ is open, the cooling or refrigerating fluid is circulated by the pump through the pipe $o$, thence upward through the system of tubes $d$ $d'$, and thence from their upper ends through the pipe $m$ to the cooler H. When the valve $o'$ is closed and the valves $p^2$ are open, the cooling or refrigerating fluid is circulated, first through the system of pipes $p$ $p'$ throughout or around the room wherein the scrubber is situated, and then through the several systems of tubes in the several chambers.

If the scrubber is situated conveniently to an ice-machine or other artificial refrigerating-machine, the cooling-fluid may be brine circulated by the brine-pump of the machine; or circulation may be produced by an elevated reservoir for liquid.

In lieu of making the surfaces within the chambers of tubes, I may make them of any hollow form, so that they may be artificially cooled or refrigerated in any suitable way. As shown, the system of the tubes $d$ $d'$ extends downward into the liquor in the chambers, and the liquor is thereby cooled or refrigerated. I may effect the desired result by cooling the liquor in the bottom of the chambers only; but I prefer to also cool the surfaces over which the liquor or water trickles, and with which the gas comes in contact in passing through the scrubber.

If desired, the cooling-fluid may be circulated through the system of pipes $p$ $p'$ around the room, and through the systems in the chambers independently of each other.

The gas may be taken into this artificially-cooled scrubber from the hydraulic main or from the hot scrubber, if one is used; or the artificially-cooled scrubber may take the place of an ordinary condenser and scrubber.

I am aware that it is not new to cool air by passing it over and in contact with pipes or other conduits or vessels through which a cooling-liquid of low temperature is circulated; and I am also aware that it is not new to pass gas through a condenser wherein it comes in contact with cooled surfaces. I am not aware, however, that gas has ever been subjected to a scrubbing operation and simultaneously passed over metallic surfaces which are artificially cooled by the circulation of a cooling or refrigerating liquid or agent, and such a method of treatment constitutes the essential feature of my invention. Very important advantages result from this artificial cooling of a scrubber. In some cases, instead of passing the gas through a scrubber and a condenser separate therefrom, I simply pass it through the scrubber, and by dispensing entirely with a separate condenser I lessen the cost of apparatus and of producing gas. I also enable a smaller scrubber to be used effectively, because I require no larger scrubber in summer than in winter, while heretofore it has been necessary to provide a scrubber larger than required for winter use in order that it should be large enough for summer use. Thus, also, I effect a saving in the cost of apparatus and in the room occupied. I also produce a highly-concentrated ammoniacal liquor of greater value than that produced by the operation of an ordinary scrubber. All the above results are augmented by artificially cooling the room wherein the scrubber is situated.

In the operation of gas-scrubbers heretofore there have been no means of regulating or controlling the temperature except by varying the quantity of water used, and in warm weather the quantity used is enormous. By my invention I effect a great saving in the quantity of water used.

What I claim as my invention, and desire to secure by Letters Patent, is—

1. The improved method of scrubbing gas, consisting in causing both the gas and the scrubbing-liquor to pass in contact with artificially-cooled surfaces, substantially as and for the purpose herein described.

2. The improved method of operating a gas-scrubber, consisting in circulating or passing the gas and washing-water over surfaces contained in the scrubber, and in simultaneously and artificially cooling or refrigerating such surfaces and cooling or refrigerating the atmosphere surrounding the scrubber, substantially as and for the purpose described.

3. The combination, with a gas-scrubber containing a system of tubes or conduits, of means for producing the circulation of the scrubbing-liquor and gas over and in contact with the surfaces of said tubes or conduits, and means for simultaneously producing the circulation of a cooling or refrigerating fluid through said tubes or conduits, substantially as and for the purpose described.

4. The combination, with a gas-scrubber containing a system of tubes or conduits, of means for producing the circulation of the scrubbing water or liquor over and in contact with the surfaces of said tubes or conduits, a system of tubes or pipes extending through the room containing the scrubber, and means for producing the circulation of a cooling or refrigerating fluid through both said systems of tubes or conduits, substantially as and for the purpose described.

5. The combination, with a scrubber containing a system of tubes or conduits partly immersed in the cooling water or liquor at the bottom of the scrubber, of means for producing the circulation of washing-water and gas over the surfaces of said tubes or conduits, and means for simultaneously producing the circulation of a cooling or refrigerating fluid through said tubes or conduits, substantially as and for the purpose described.

6. The combination, with a scrubber containing a system of tubes or conduits, of means for producing the circulation of the washing water or liquor and gas over the surfaces of said tubes or conduits, a cooler connected with the upper end of said system, a pump connected with the lower end of the system, and a suction-pipe leading from the cooler to the pump, substantially as and for the purpose described.

CHAS. W. ISBELL.

Witnesses:
FREDK. HAYNES,
ED. L. MORAN.